United States Patent
Clatot et al.

(10) Patent No.: US 10,000,404 B2
(45) Date of Patent: Jun. 19, 2018

(54) GLASS MANUFACTURING METHOD USING ELECTRIC MELTING

(71) Applicant: SAINT-GOBAIN ISOVER, Courbevoie (FR)

(72) Inventors: Richard Clatot, Fleurines (FR); Stéphane Maugendre, Precy sur Oise (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 75 days.

(21) Appl. No.: 14/654,189

(22) PCT Filed: Dec. 20, 2013

(86) PCT No.: PCT/FR2013/053223
§ 371 (c)(1),
(2) Date: Jun. 19, 2015

(87) PCT Pub. No.: WO2014/096737
PCT Pub. Date: Jun. 26, 2014

(65) Prior Publication Data
US 2015/0315068 A1    Nov. 5, 2015

(30) Foreign Application Priority Data

Dec. 21, 2012 (FR) .................... 12 62642

(51) Int. Cl.
| | |
|---|---|
| C03B 37/09 | (2006.01) |
| C03B 5/027 | (2006.01) |
| C03C 3/087 | (2006.01) |
| C03C 13/06 | (2006.01) |
| C03B 37/04 | (2006.01) |
| C03C 3/062 | (2006.01) |
| C03C 3/064 | (2006.01) |
| C03C 3/091 | (2006.01) |
| C03C 3/097 | (2006.01) |

(52) U.S. Cl.
CPC .............. *C03B 5/027* (2013.01); *C03B 37/04* (2013.01); *C03B 37/09* (2013.01); *C03C 3/062* (2013.01); *C03C 3/064* (2013.01); *C03C 3/087* (2013.01); *C03C 3/091* (2013.01); *C03C 3/097* (2013.01); *C03C 13/06* (2013.01); *C03C 2213/00* (2013.01)

(58) Field of Classification Search
CPC ......... C03C 3/062; C03C 3/064; C03C 3/087; C03C 3/091; C03C 3/097; C03C 13/06; C03C 2213/00; C03B 5/027; C03B 37/04; C03B 37/09; C03B 37/092
See application file for complete search history.

(56) References Cited

U.S. PATENT DOCUMENTS

| | | | |
|---|---|---|---|
| 3,928,049 A | 12/1975 | Otouma et al. | |
| 4,376,598 A | 3/1983 | Brouns et al. | |
| 4,396,722 A * | 8/1983 | Rapp ................ | C03C 13/00 501/35 |
| 4,421,538 A * | 12/1983 | Demaschquie .......... | C03B 7/07 373/32 |
| 5,188,649 A | 2/1993 | Macedo et al. | |
| 5,935,885 A | 8/1999 | Hnat et al. | |
| 6,001,494 A | 12/1999 | Kuchinski et al. | |
| 6,125,658 A * | 10/2000 | Maugendre ............ | C03B 5/031 219/420 |
| 6,998,361 B2 * | 2/2006 | Lewis ................... | C03C 3/087 501/35 |
| 8,697,588 B2 * | 4/2014 | Brown ................... | C03B 37/06 501/27 |
| 2006/0162391 A1 * | 7/2006 | Hansen .................. | C03B 1/02 65/482 |
| 2008/0191179 A1 | 8/2008 | Bernard et al. | |
| 2013/0330534 A1 | 12/2013 | Schinkinger et al. | |

FOREIGN PATENT DOCUMENTS

| | | | | |
|---|---|---|---|---|
| EA | 004259 B1 | 2/2004 | | |
| WO | WO 01/42154 A1 | 6/2001 | | |
| WO | WO 2011006875 A2 * | 1/2011 | ............. | C03C 3/097 |
| WO | WO2012/083334 A2 | 6/2012 | | |
| WO | WO-2012140173 A1 * | 10/2012 | ............. | C03B 5/025 |
| WO | WO 2013087251 A2 * | 6/2013 | ............. | C03C 3/087 |

OTHER PUBLICATIONS

International Search Report dated Apr. 8, 2014, in PCT/FR2013/053223, filed Dec. 20, 2013.
George H. Beall, et al., "Basalt Glass Ceramics", Bull. Am. Ceram. Soc., vol. 55, No. 6, Jun. 1976 (Jun. 1976), pp. 579-582, XP001277621.

* cited by examiner

*Primary Examiner* — Elizabeth A. Bolden
(74) *Attorney, Agent, or Firm* — Oblon, McClelland, Maier & Neustdat, L.L.P.

(57) ABSTRACT

One subject of the invention is a process for manufacturing a glass, the chemical composition of which comprises at least 3% by weight of iron oxide, expressed in the form $Fe_2O_3$, comprising a step of electric melting, using electrodes submerged in the molten glass, of a vitrifiable batch material mixture containing at least one manganese carrier wherein the manganese is in an oxidation state higher than +2.

14 Claims, No Drawings

GLASS MANUFACTURING METHOD USING ELECTRIC MELTING

The invention relates to the field of the melting of glass. It relates more specifically to the electric melting of glass intended to be converted into mineral wool by fiberizing.

The expression "electric melting" is understood to mean that the glass is melted by the Joule effect, using electrodes submerged in the glass bath, generally with the exclusion of any use of other heating means, such as flames. The molten glass bath is held in a tank consisting of refractory blocks. Within the context of a continuous melting process, the furnace is fed by spreading on the surface of the glass bath a vitrifiable mixture of batch materials, in the form of pulverulent materials, which forms a crust on the surface of the glass bath. Under the effect of the heat generated by the Joule effect, the materials undergo melting reactions and react together to form molten glass.

The inventors have been able to demonstrate that, in the case of the melting of glasses containing a large amount of iron oxide, the introduction into the vitrifiable mixture of an oxidized manganese carrier surprisingly made it possible to considerably reduce the temperature of the glass in the furnace while retaining the same output. The service life of the furnaces and of the electrodes is thereby greatly extended.

One subject of the invention is a process for manufacturing a glass, the chemical composition of which comprises at least 3% by weight of iron oxide, expressed in the form $Fe_2O_3$, comprising a step of electric melting, using electrodes submerged in the molten glass, of a vitrifiable batch material mixture containing at least one manganese carrier wherein the manganese is in an oxidation state higher than +2.

The process according to the invention is preferably such that after the melting step the glass is formed into mineral wool during a fiberizing step.

Another subject of the invention is a mineral wool comprising glass fibers having a chemical composition comprising the following constituents within the limits defined below expressed as weight percentages:

| | |
|---|---|
| $SiO_2$ | 35-55%, in particular 39-48% |
| $Al_2O_3$ | 14-27%, in particular 16-27% |
| CaO | 3-35%, in particular 5-20% |
| MgO | 0-15%, in particular 0-5% |
| $Na_2O + K_2O$ | 1-17%, in particular 9-15% |
| $Fe_2O_3$ | 3-15%, in particular 3-10% |
| $B_2O_3$ | 0-8%, in particular 0% |
| $P_2O_5$ | 0-3%, in particular 0-1% |
| $TiO_2$ | 0-2%, in particular 0-1% |
| $MnO_2$ | 0.4-2%, in particular 0.5-1%. |

Throughout the whole of the text, the contents are expressed as weight percentages.

The chemical composition of the glass preferably comprises a weight content of iron oxide, expressed in the form $Fe_2O_3$, of at least 4%, or 5% and/or of at most 15%, in particular 10% and even 9% or else 8%. The glass is preferably an alkali metal and alkaline-earth metal aluminosilicate.

If the (total) content of iron oxide in the form $Fe_2O_3$ is expressed, this does not mean that this iron oxide is necessarily and exclusively present in the glass in the ferric form. The glass generally contains iron oxide both in its ferric ($Fe_2O_3$) and ferrous (FeO) forms, and it is by pure convention that the total content of iron oxide is denoted by $Fe_2O_3$. The same applies for the manganese oxide, the expression "$MnO_2$" not predicting the degrees of oxidation of the manganese ions in the glass.

The chemical composition of the glass preferably comprises the following constituents, within the limits expressed as weight percentages defined in table 1 below. The numbers that appear in the columns of the table define increasingly preferred ranges for each constituent. In combination, these ranges define increasingly preferred compositions denoted A, B and C. It is however clearly understood the each of the ranges of one of these compositions may be combined with any other range belonging to another composition.

TABLE 1

| | A | B | C |
|---|---|---|---|
| $SiO_2$ | 35-55% | 39-48% | 40-45% |
| $Al_2O_3$ | 14-27% | 16-27% | 18-26% |
| CaO | 3-35% | 5-20% | 8-18% |
| MgO | 0-15% | 0-5% | 0.5-3% |
| $Na_2O + K_2O$ | 1-17% | 9-15% | 10-13% |
| $Fe_2O_3$ | 3-15% | 3-10% | 4-8% |
| $B_2O_3$ | 0-8% | 0-2% | 0 |
| $P_2O_5$ | 0-3% | 0-1% | 0-0.5% |
| $TiO_2$ | 0-2% | 0-1% | 0.1-1% |

Owing to the introduction of a manganese carrier, the chemical composition of the glass obtained by the process according to the invention, and in particular for the compositions A, B, C above, also comprises manganese oxide. The weight content of $MnO_2$ in the glass is preferably at least 0.05%, in particular 0.1%, or 0.2% and even 0.3%. This content is advantageously within a range extending from 0.4% to 2%, in particular from 0.5% to 1%.

These compositions are particularly well suited to the shaping of the glass in the form of mineral wools.

The sum of the silica and alumina contents is preferably between 57% and 70%, in particular between 62% and 68%. The alumina content is preferably within a range extending from 20% to 25%, in particular from 21% to 24%.

The silica content is advantageously within a range extending from 40% to 44%.

The magnesia content is advantageously at most 3%, or 2.5%, in order to minimize the liquidus temperature, and therefore the fiberizing temperature, so as to optimize the service life of the centrifuges.

The lime content is preferably within a range extending from 10% to 17%, in particular from 12% to 16%. The sum of the lime and magnesia contents is itself preferably within a range extending from 14% to 20%, in particular from 15% to 18%. Preferably, the barium oxide content is at most 1%, in particular 0.5%. The strontium oxide content is itself preferably at most 1%, or 0.5% and even 0.1% or else zero.

The total content of alkali metal oxides (sodium oxide and potassium oxide) is preferably at most 13%, or 12%. The $Na_2O$ content is advantageously within a range extending from 4% to 9%, in particular from 5% to 8%, while the $K_2O$ content is advantageously within a range extending from 3% to 6%.

The iron oxide has a positive impact on the nucleation and growth of seeds at low temperature, and therefore on the temperature behavior of the mineral wool, while not having a detrimental effect on the liquidus temperature. Its total content (expressed in the form $Fe_2O_3$, whether the iron is in ferric or ferrous form) is preferably at least 4%, or 5% and/or at most 7% or 6%.

$P_2O_5$ may be used, at contents of between 0 and 3%, in particular between 0.1% and 1.2% for increasing the biosolubility of fibers at neutral pH. Titanium oxide provides a very noticeable effect on the high- and low-temperature nucleation of spinels in the glassy matrix. A content of the order of 1% or less may prove advantageous.

Preferably, the total content of $SiO_2$, $Al_2O_3$, CaO, MgO, $Na_2O$, $K_2O$, $Fe_2O_3$ (total iron) is at least 90%, in particular 95% and even 97% or 98%.

The detailed description of the above glass composition, including the preferred compositions A, B and C, applies both to the composition of the molten glass (in the furnace) and to the final composition of the glass, and in particular of the mineral wool according to the invention.

These compositions, in particular the compositions B and C, are in particular well suited to the internal centrifugation fiberizing process, with a viscosity at the temperature of 1400° C. generally of more than 40 poise, in particular of the order of 50 to 100 poise (1 poise=0.1 Pa·s).

These compositions have high glass transition temperatures, especially greater than 600° C., in particular greater than or equal to 650° C. Their upper annealing temperature (annealing point) is generally considerably greater than 600° C., in particular of the order of 670° C. or more, often 700° C. or more.

The fiberizing step is preferably carried out by internal centrifugation, for example according to the teaching of application WO 93/02977. The compositions, in particular B and C, are indeed well suited to this fiberizing method, their working ranges (corresponding to the difference between the temperature at which the decimal logarithm of the viscosity is equal to 2.5 and the liquidus temperature) generally being at least 50° C., or 100° C. and even 150° C. The liquidus temperatures are not very high, generally at most 1200° C., or 1150° C., and are compatible with the use of centrifuges. The internal centrifugation process uses centrifuges, also known as fiberizing spinners, that rotate at high speed and pierced with orifices at their periphery. The molten glass is conveyed by gravity to the center of the centrifuge, and, under the effect of centrifugal force, is ejected through the orifices in order to form glass streams, which are drawn downward by jets of hot gases emitted by burners.

The fiberizing step may also be carried out by external centrifugation, in particular for compositions of type A. In this process, the molten glass is poured onto the periphery of rotors rotating at high speed.

After fiberizing, the fibers obtained are bonded together with the aid of a sizing composition sprayed onto their surface, before being received and formed in order to give various mineral wool products, such as rolls or panels.

The or each manganese carrier is preferably selected from $MnO_2$, $Mn_3O_4$, $Mn_2O_3$, $Mn_2O_7$, permanganates, in particular of sodium, potassium or else of calcium or of magnesium, or any mixture thereof. The manganese carriers generally contain manganese in the +3 or +4, or even +6 or +7, oxidation state. The manganese carriers may in particular be introduced by the following minerals: pyrolusite ($MnO_2$), hausmannite ($Mn_3O_4$), bixbyite ($Mn_2O_3$), birnessite ((Na, Ca, K)$_x$Mn$_2$O$_4$·H$_2$O).

The total amount of manganese carrier contained in the vitrifiable batch material mixture is advantageously such that one tonne of said dry mixture comprises between 1 and 20 kg, in particular between 2 and 10 kg, preferably between 4 and 8 kg of manganese in an oxidation state higher than +2, expressed in the form $MnO_2$. The amount of oxidized manganese is preferably adapted as a function of the amount of reducing agents contained in the vitrifiable mixture, for example the organic impurities.

Preferably, the vitrifiable mixture contains no nitrate, in particular no inorganic nitrate.

The vitrifiable mixture generally comprises materials selected from silica carriers, preferably sand, alumina carriers (bauxite, phonolite, feldspars, nepheline, nepheline syenite, blast furnace slag, basalt), limestone, dolomite. The vitrifiable mixture also preferably comprises cullet, that is to say glass that is already formed, optionally recycled.

The furnace normally comprises a tank consisting of a bottom and side walls. The tank may comprise refractory materials and/or metal materials. The refractory materials are for example made of chromium oxide or based on this oxide, which has a very good resistance to corrosion by the molten glass. When the tank contains metal materials, it is advantageously composed of water jackets, that is to say metal double jackets in which a coolant, typically water, circulates. The water jackets may be lined with refractory materials that are in contact with the glass, or not in contact with the glass, in which case the glass is in direct contact with one envelope of the water jacket.

The electrodes are submerged in the molten glass. They may be suspended so as to drop into the glass bath from above, be installed in the tank bottom, or else be installed in the side walls of the tank. The first two options are generally preferred for large-sized tanks in order to distribute the heating of the glass bath as best possible.

The electrodes are preferably made of molybdenum, or even optionally made of tin oxide. The molybdenum electrode passes through the tank bottom preferably via a water-cooled steel electrode holder.

Besides the tank, the furnace may or may not comprise a superstructure. The vitrifiable mixture is normally distributed homogenously over the surface of the glass bath using a mechanical device, and thus constitutes a heat screen limiting the temperature above the glass bath, so that the presence of a superstructure is not always necessary.

During the melting step, the temperature of the glass, measured in contact with the tank refractories and at the hottest point, is preferably within a range extending from 1400° C. to 1700° C., in particular from 1450° C. to 1680° C. and even from 1500° C. to 1650° C., or else from 1500° C. to 1600° C. Specifically, it is within this temperature range that the beneficial effect of the oxidized manganese appears with greatest intensity.

The example that follows illustrates the invention without however limiting it.

In a furnace comprising a tank consisting of a bottom and side walls formed of chromium oxide refractories, equipped with three molybdenum electrodes submerged in the glass bath, a glass having the following weight composition was melted:

| | |
|---|---|
| $SiO_2$ | 42.7% |
| $Al_2O_3$ | 21.7% |
| $Fe_2O_3$ | 5.8% |
| CaO | 14.8% |
| MgO | 2.4% |
| $Na_2O$ | 6.2% |
| $K_2O$ | 5.0%. |

In order to do this, the vitrifiable mixture consisted (as dry weight, and for one tonne of final glass) of 838 kg of phonolite, of 95 kg of limestone, of 80 kg of bauxite, of 57 kg of dolomite, of 23 kg of sodium carbonate and of 20 kg of iron oxide.

One tonne of this (dry) mixture additionally contained 6 kg of a manganese dioxide (+4 oxidation state) having a purity of 62%, i.e. an amount of the order of 4 kg of $MnO_2$.

In a steady production regime, with an output of 6 tonnes/day, the temperature of the glass, measured with the aid of a thermocouple in contact with the tank refractories, was 1590° C. The temperature measured directly under the crust was around 1400° C., over a wide zone extending from close to the electrodes (50 mm) to close to the tank refractories.

Analogous results were obtained using $Mn_2O_3$ as oxidized manganese carrier (+3 oxidation state).

For comparison purposes, the oxidized manganese carrier was then eliminated from the vitrifiable mixture. In a steady regime, with the same output of 6 tonnes/day, the maximum temperature in contact with the tank refractories was 1660° C. The temperature under the crust itself varied between 1200° C. and 1300° C.

Similar results in terms of temperature in contact with the tank refractories were obtained during tests involving the addition to the vitrifiable mixture of manganese oxide MnO (+2 oxidation state), introduced by means of an alumina carrier.

The temperatures measured close to the electrodes were themselves around 100° C. to 150° C. lower when the vitrifiable mixture comprised an oxidized manganese carrier (oxidation state higher than 2) compared to the reference tests in which the vitrifiable mixture either contained no manganese oxide, or contained an MnO (oxidation state of 2) carrier.

Owing to the addition of an oxidized manganese carrier, the content of chromium and molybdenum impurities in the final glass was reduced by a factor of 10 and 2 respectively, attesting to the lower wear of the refractories and electrodes.

Introduction of an oxidized manganese carrier has therefore made it possible to very significantly reduce the temperature of the glass bath, in particular in contact with the refractories and electrodes, and therefore the wear of the latter, while retaining the same output.

The gains provided by the invention in terms of service life of the furnaces are therefore considerable.

The invention claimed is:

1. A process for manufacturing a glass comprising from 3-15% by weight of iron oxide, expressed in the form $Fe_2O_3$, the process comprising:
    electric melting, with electrodes submerged in a molten glass, of a vitrifiable batch material mixture comprising at least one manganese carrier in which manganese is in an oxidation state higher than +2,
    wherein the glass comprises, by weight percentages:

| | |
|---|---|
| $SiO_2$ | 35-55%; |
| $Al_2O_3$ | 14-27%; |
| CaO | 12-16%; |
| MgO | 0-6%; |
| $Na_2O + K_2O$ | 1-17%; |
| $B_2O_3$ | 0-8%; |
| $P_2O_5$ | 0-3%; and |
| $TiO_2$ | 0-2%, and | wherein the glass comprises a combined content of CaO and MgO in the range of 14 to 18% by weight.

2. The process of claim 1, wherein the at least one manganese carrier is selected from $MnO_2$, $Mn_3O_4$, $Mn_2O_3$, $Mn_2O_7$, a permanganate, or any mixture thereof.

3. The process of claim 1, wherein a total amount of manganese carrier contained in the vitrifiable batch material mixture is such that one ton of a dry mixture thereof comprises an amount ranging from 1 to 20 kg of manganese in an oxidation state higher than +2, expressed in the form $MnO_2$.

4. The process of claim 1, wherein the at least one manganese carrier is selected from $Mn_3O_4$, $Mn_2O_3$, $Mn_2O_7$, a permanganate, or any mixture thereof.

5. The process of claim 1, wherein the at least one manganese carrier is $Mn_2O_3$.

6. The process of claim 1, wherein a total amount of manganese carrier contained in the vitrifiable batch material mixture is such that one ton of a dry mixture thereof comprises an amount ranging from 2 to 10 kg of manganese in an oxidation state higher than +2, expressed in the form $MnO_2$.

7. The process of claim 1, wherein a total amount of manganese carrier contained in the vitrifiable batch material mixture is such that one ton of a dry mixture thereof comprises an amount ranging from 4 to 8 kg of manganese in an oxidation state higher than +2, expressed in the form $MnO_2$.

8. The process of claim 1, wherein the glass composition comprises at least 0.3% by weight of manganese oxide, expressed in the form $MnO_2$.

9. The process of claim 1, wherein the vitrifiable mixture contains no nitrate.

10. The process of claim 1, wherein the glass comprises a combined content of CaO and MgO in the range of 15 to 18% by weight.

11. The process of claim 1, wherein the electrodes comprise molybdenum.

12. The process of claim 1, wherein the electrodes comprise tin oxide.

13. The process of claim 1, wherein during the melting the temperature of the molten glass, measured in contact with tank refractories and at a hottest point, ranges from 1400° C. to 1650° C.

14. The process of claim 1, wherein after the melting the molten glass is formed into mineral wool during a fiberizing step.

* * * * *